(12) United States Patent
Strandborg et al.

(10) Patent No.: US 12,326,969 B1
(45) Date of Patent: Jun. 10, 2025

(54) TRACKING ACCURACY WITH HEAD POSE PREDICTION

(71) Applicant: Distance Technologies Oy, Helsinki (FI)

(72) Inventors: Mikko Strandborg, Hangonkylä (FI); Urho Konttori, Helsinki (FI); Thomas Carlsson, Vantaa (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 18/630,154

(22) Filed: Apr. 9, 2024

(51) Int. Cl.
- *G06F 3/01* (2006.01)
- *G09G 3/00* (2006.01)
- *H04N 23/20* (2023.01)
- *G02B 27/01* (2006.01)

(52) U.S. Cl.
CPC ............... *G06F 3/012* (2013.01); *G06F 3/013* (2013.01); *G09G 3/001* (2013.01); *H04N 23/20* (2023.01); *G02B 27/0101* (2013.01); *G02B 2027/0187* (2013.01); *G09G 2340/0435* (2013.01); *G09G 2354/00* (2013.01); *G09G 2380/10* (2013.01)

(58) Field of Classification Search
CPC ......... G06F 3/012; G06F 3/013; G09G 3/001; G09G 2340/0435; G09G 2354/00; G09G 2380/10; H04N 23/20; G02B 27/0101; G02B 2027/0187
See application file for complete search history.

(56) References Cited

U.S. PATENT DOCUMENTS

| | | | |
|---|---|---|---|
| 9,459,692 B1 * | 10/2016 | Li | G02B 27/017 |
| 2023/0065018 A1 * | 3/2023 | Dorn | G06F 3/011 |
| 2024/0112428 A1 * | 4/2024 | Levi | G06F 3/017 |

* cited by examiner

*Primary Examiner* — Dmitriy Bolotin
(74) *Attorney, Agent, or Firm* — Ziegler IP Law Group, LLC.

(57) ABSTRACT

Tracking means is utilised to track a position and an orientation of a head of user(s) sitting inside a vehicle. A vehicular acceleration signal is determined for a first time period, based on at least one of: an acceleration, an orientation of the vehicle sensed by sensor(s) during the first time period. Transformation(s) is/are applied to the vehicular acceleration signal to generate a head acceleration signal for a second time period, wherein the head acceleration signal is indicative of a change in at least one of: an acceleration, the orientation of the head. An expected head movement of the user(s) is determined, based on the head acceleration signal. The position and the orientation of the head being tracked by utilising the tracking means are refined, based on the expected head movement.

16 Claims, 4 Drawing Sheets

TRACKING ACCURACY WITH HEAD POSE PREDICTION

TECHNICAL FIELD

The present disclosure relates to systems for improving tracking accuracy with head pose predictions. The present disclosure also relates to methods for improving tracking accuracy with head pose predictions.

BACKGROUND

Head-up display (HUD) technology has emerged as a significant advancement across various domains (for example, automotive sectors, aviation sectors, military sectors, and the like) for presenting visual information to users without diverting their attention from their primary tasks, for example, such as driving a vehicle. Some HUDs utilise a head-pose tracking system to determine a viewing direction from where the visual information is to be displayed to user(s).

However, ensuring an accurate operation of the HUD relies heavily on a tracking quality and a responsiveness of the head-pose tracking system. A high tracking quality and responsiveness of the head-pose tracking system is particularly required in dynamic environments, such as inside moving vehicles where sudden movements and vibrations are likely to be experienced by users that are present inside said moving vehicles. Existing head-pose tracking systems often employ visible-light cameras and/or near-infrared cameras to capture a continuous stream of images, in order to track head poses of the users. However, the existing head-pose tracking systems are highly unreliable and inefficient in terms of accurately tracking the head poses of the users in real time or near-real time, especially, when such existing head-pose tracking systems are employed in the aforesaid dynamic environments. As a result, the head poses are tracked with considerably high latency and error, leading to generation of pose-inconsistent images. When such pose-inconsistent images are displayed to the users, a viewing experience of the users is adversely affected, and becomes unrealistic and non-immersive.

Therefore, in light of the foregoing discussion, there exists a need to overcome the aforementioned drawbacks.

SUMMARY

The present disclosure seeks to provide a system and a method to accurately and reliably refine a position and an orientation of a head of user(s) sitting inside a vehicle, in a time-efficient and computationally-efficient manner. The aim of the present disclosure is achieved by a system and a method which incorporate head pose prediction for improving tracking accuracy, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
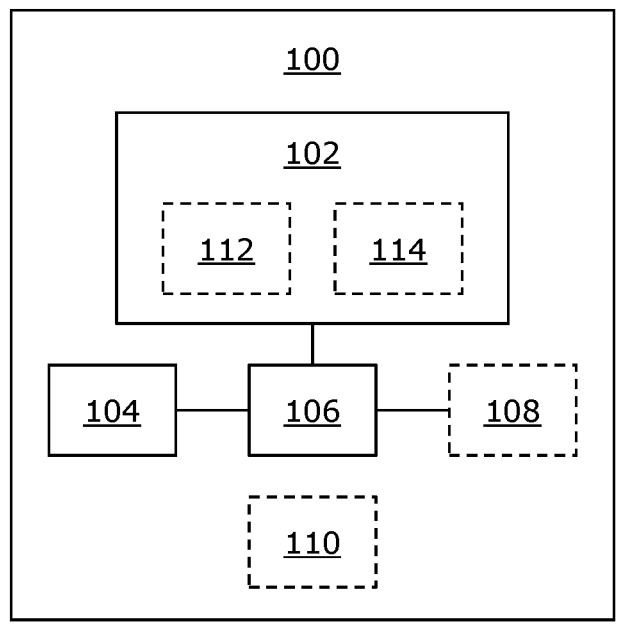
FIG. 1 illustrates a block diagram of an architecture of a system for improving tracking accuracy with head pose prediction, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:

tracking means;

at least one sensor employed to sense at least one of: an acceleration, an orientation of a vehicle; and at least one processor configured to:

utilise the tracking means to track a position and an orientation of a head of at least one user sitting inside the vehicle;

determine a vehicular acceleration signal for a first time period, based on the at least one of: the acceleration, the orientation of the vehicle sensed during the first time period, wherein the vehicular acceleration signal is indicative of a change in the at least one of: the acceleration, the orientation of the vehicle;

apply at least one transformation to the vehicular acceleration signal to generate a head acceleration signal for a second time period, wherein the head acceleration signal is indicative of a change in at least one of: an acceleration, the orientation of the head of the at least one user;

determine an expected head movement of the at least one user, based on the head acceleration signal; and refine the position and the orientation of the head of the at least one user being tracked by utilising the tracking means, based on the expected head movement.

In a second aspect, an embodiment of the present disclosure provides a method comprising:
- utilising tracking means to track a position and an orientation of a head of at least one user sitting inside a vehicle;
- determining a vehicular acceleration signal for a first time period, based on at least one of: an acceleration, an orientation of the vehicle sensed by employing at least one sensor during the first time period, wherein the vehicular acceleration signal is indicative of a change in the at least one of: the acceleration, the orientation of the vehicle;
- applying at least one transformation to the vehicular acceleration signal to generate a head acceleration signal for a second time period, wherein the head acceleration signal is indicative of a change in at least one of: an acceleration, the orientation of the head of the at least one user;
- determining an expected head movement of the at least one user, based on the head acceleration signal; and
- refining the position and the orientation of the head of the at least one user being tracked by utilising the tracking means, based on the expected head movement.

The present disclosure provides the aforementioned system and the aforementioned method for accurately and reliably refining the position and the orientation of the head of the at least one user sitting inside the vehicle, in a time-efficient and computationally-efficient manner. Herein, the head acceleration signal is generated (using the vehicular acceleration signal) to determine an expected (namely, anticipated or predicted) motion of the head of the at least one user (in response to an impact of the vehicular acceleration signal), and then the position and the orientation of the head being tracked by utilising the tracking means is refined (namely, adjusted) by taking into account said expected motion, for improved accuracy and precision. In this way, even when the vehicle is in motion and sudden movements and vibrations from the vehicle are likely to be experienced by the at least one user, the position and the orientation of the head can be determined (upon said refining) with a high accuracy, in real time or near-real time. Beneficially, this may also allow for producing a synthetic light field according to the position and orientation of the head with low latency and reduced error. The system and the method are simple, robust, fast, reliable, support real-time improvement in tracking accuracy with head pose prediction, and can be implemented with ease.

Throughout the present disclosure, the term "tracking means" refers to a specialised equipment for detecting and/or following a position and an orientation of at least a head of a given user sitting inside the vehicle. The vehicle could, for example, be a car, a truck, an aircraft, a speed boat or the like. Optionally, the tracking means is implemented as at least one tracking camera. The at least one tracking camera may comprise at least one of: at least one visible-light camera, at least one infrared (IR) camera, at least one depth camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of the depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera and the at least one depth camera) may be utilised in the tracking means. When different types of images captured by the various different types of cameras are utilised, the position and the orientation of at least the head of the given user can be determined accurately, as results obtained from one type of image can be used to refine results obtained from another type of image. Herein, these different types of images constitute the tracking data collected by the tracking means, and may be in the form of at least one of: visible-light images, IR images, depth images.

Optionally, when utilising the tracking means, the at least one processor is configured to process tracking data collected by the tracking means, to determine a position and an orientation of the head of the given user at a given time instant. Optionally, in this regard, when the tracking means is implemented as the at least one tracking camera, the tracking data comprises a plurality of images (namely, visible-light images and/or IR images and/or depth images) representing at least the head of the given user sitting inside the vehicle, wherein when processing the tracking data, the at least one processor is configured to employ at least one image processing algorithm. Utilising tracking cameras for tracking positions and orientations of a user's head is well-known in the art.

It will be appreciated that the at least one tracking camera is arranged to face the at least one user, to facilitate tracking the position and the orientation of the head of the at least one user. Optionally, the position and the orientation of the head of the at least one user are represented in a given coordinate space. As an example, the given coordinate space may be a Cartesian coordinate space. It will be appreciated that the tracking means continuously tracks the position and the orientation of the head of the at least one user throughout a given session of using the system. In such a case, the at least one processor is configured to repeatedly determine the position and the orientation of the head of the at least one user (in real time or near-real time).

Throughout the present disclosure, the term "sensor" refers to an equipment that is operable to detect (namely, sense) the acceleration and/or the orientation of the vehicle. Optionally, the at least one sensor comprises at least one of: at least one accelerometer, at least one gyroscopic sensor. Optionally, the at least one sensor further comprises at least one magnetometer. It is to be understood that the at least one accelerometer could be employed to sense changes in the acceleration of the vehicle. The at least one gyroscopic sensor could be employed to sense changes in the orientation of the vehicle (for example, such as in terms of pitch, roll, and yaw angles). The at least one magnetometer could be employed to sense changes in the orientation of the vehicle relative to the Earth's magnetic field. It will be appreciated that the at least one accelerometer, the at least one gyroscopic sensor, and the at least one magnetometer could be parts of an inertial measurement unit (IMU) or a triaxial inertial measurement unit (TIMU). Accelerometers, gyroscopic sensors, magnetometers, IMUs, and TIMUs are well-known in the art. The at least one processor is configured to process sensor data, collected by the at least one sensor, to determine the acceleration and/or the orientation of the vehicle at a given time instant. The sensor data may be in form of IMU/TIMU values, motion sensor data values, magnetic field strength values, or similar. It will be appreciated that the at least one sensor repeatedly collects the sensor data throughout the given session of using the system. Accordingly, the at least one processor is configured to repeatedly process the sensor data to determine the acceleration and/or the orientation of the vehicle.

Notably, the at least one processor controls an overall operation of the system. The at least one processor is communicably coupled to at least the tracking means and the at least one sensor. In some implementations, the at least one processor is implemented as a processor of a light field display unit. In other implementations, the at least one processor is implemented as a processor of a computing device.

Examples of the computing device include, but are not limited to, a laptop, a tablet, a phablet, and a smartphone. In yet other implementations, the at least one processor is implemented as a cloud server (namely, a remote server) that provides a cloud computing service.

Throughout the present disclosure, the term "vehicular acceleration signal" refers to a digital signal which indicates a change in the acceleration of the vehicle and/or a change in the orientation of the vehicle. Greater the amplitude of the vehicular acceleration signal, greater is the change in the at least one of: the acceleration, the orientation of the vehicle, and vice versa. It is to be understood that the acceleration of the vehicle may change in various scenarios, for example, such as when the vehicle starts moving from a stationary position, when brakes are applied to slow down or stop the vehicle, when the vehicle is accelerated to increase its speed, when the vehicle is driven downhill, when the vehicle is driven uphill, when the vehicle is making a turn, when the vehicle is driven on an uneven road (namely, a road having bumps and/or potholes), and the like. Similarly, the orientation of the vehicle may change in various scenarios, for example, such as when the vehicle is making a turn, when the vehicle is laterally shifted while switching lanes on a multi-lane road, when the vehicle is being parked at a parking spot or exiting from the parking spot, and the like. It will be appreciated that since the at least one sensor is employed to repeatedly sense the acceleration and/or the orientation of the vehicle, the at least one processor can easily and accurately determine the change in the acceleration and/or the orientation of the vehicle for the first time period, for example, by processing the sensor data collected by the at least one sensor during the first time period. Optionally, the first time period lies in a range of 10 milliseconds to 1000 milliseconds; more optionally, in a range of 10 milliseconds to 500 milliseconds; yet more optionally, in a range of 10 milliseconds to 200 milliseconds. When the first time period lies in any of the aforesaid ranges, the first time period is understood to be a very short time period.

Throughout the present disclosure, the term "transformation" refers to an operation that is applied to the vehicular acceleration signal to generate the head acceleration signal. It will be appreciated that when applying the at least one transformation to the vehicular acceleration signal, the at least one processor is optionally configured to modify the vehicular acceleration signal by taking into account how the position and/or the orientation of the head of the at least one user is likely to change according to the change in the acceleration and/or the orientation of the vehicle, to generate the head acceleration signal. Such a modification may involve using one or more signal processing techniques, for example, such as a filtering technique, a smoothing technique, a scaling technique, and the like.

Throughout the present disclosure, the term "head acceleration signal" refers to a digital signal which indicates an expected change in the at least one of: the acceleration, the orientation of the head of the at least one user, based on the vehicular acceleration signal. Greater the amplitude of the head acceleration signal, greater is the expected change in the acceleration and/or the orientation of the head of the at least one user, and vice versa. It is to be noted that greater the amplitude of the vehicular acceleration signal, greater is the amplitude of the head acceleration signal, and vice versa; however, the amplitude of the head acceleration signal is considerably smaller as compared to the amplitude of the vehicular acceleration signal. This is because the at least one user is assumed to be wearing a seat belt while sitting inside the vehicle. Additionally, suspension settings of the vehicle and a biomechanical structure and musculature of a human act as a buffer for absorbing and dampening an impact of the vehicular acceleration signal on the head of the at least one user. Therefore, the head would likely experience lesser change in the acceleration and/or the orientation as compared to the vehicle, in response to same factors such as changes in speed, road conditions, driving manoeuvres, or the like. In other words, the head would receive an attenuated impact of said change in the acceleration and/or the orientation of the vehicle. This results in a lower amplitude of the head acceleration signal. This has been also illustrated in conjunction with FIG. 3, for clarity and better understanding.

In some implementations, the second time period partially overlaps with the first time period. In such implementations, the second time period starts after a start of the first time period, but before the first time period ends, and the second time period ends after the first time period has ended. In other implementations, the second time period does not overlap with the first time period at all. In such implementations, the second time period starts (just) after the first time period has ended. Notably, the second time period is different from the first time period, irrespective of whether it overlaps with the first time period or not. This is because when the vehicle is in motion, any change in the acceleration and/or the orientation of the vehicle highly likely affects (namely, changes) the position and/or the orientation of the head of the at least one user after a certain amount of time has passed. In other words, such an impact may not be received by the head concurrently, but is rather received after some time. Therefore, the head acceleration signal is generated for the second time period that may partially overlap with the first time period, or that may not overlap with the first time period at all. In an example, the head of the at least one user may likely receive an impact of the vehicular acceleration signal after 50 milliseconds. In such an exemplary scenario, if the first time period is taken as 200 milliseconds, there would be an overlap between the second time period and the first time period. However, if the first time period is taken as only 30 milliseconds, there may not be any overlap between the second time period and the first time period, because the second time period starts after 50 milliseconds from the start of the first time period.

Optionally, the at least one transformation comprises at least one of:
- a phase-shift transformation corresponding to a delay between a start of the second time period and a start of the first time period,
- a dampening transformation corresponding to dampening of an effect of the change in the at least one of: the acceleration, the orientation of the vehicle upon the change in the at least one of: the acceleration, the orientation of the head of the at least one user.

In this regard, when the vehicle is in motion, the head of the at least one user is likely to receive the impact of the vehicular acceleration signal after some time (as discussed earlier). This introduces the delay between the start of the second time period (namely, a time instant at which the head of the at least one user is starting to receiving the impact) and the start of the first time period (namely, a time instant at which the vehicle is starting to undergo the change in the acceleration and/or the orientation). Thus, when generating the head acceleration signal, the phase-shift transformation would be applied to the vehicular acceleration signal in a manner that compensates for the aforesaid delay, and thus a timing of the head acceleration signal is accordingly adjusted relative to the vehicular acceleration signal. Beneficially, in this way, the head acceleration signal and the vehicular acceleration signal are well-synchronised.

Furthermore, optionally, the dampening transformation involves reducing or attenuating an amplitude (namely, an intensity) of the vehicular acceleration signal, when generating the head acceleration signal. This is because due to the suspension settings of the vehicle and the biomechanical structure and musculature of the human, the head of the at least one user is likely to experience a reduced impact of the change in the at least one of: the acceleration, the orientation of the vehicle, when the vehicle is in motion (as discussed earlier). Therefore, the amplitude of the head acceleration signal is highly likely to be smaller, as compared to the amplitude of the vehicular acceleration signal. In this regard, when generating the head acceleration signal, the dampening transformation would be applied to the vehicular acceleration signal in a manner that mitigates or dampens the effect of the change in the acceleration and/or the orientation of the vehicle on the change in the acceleration and/or the orientation of the head. Beneficially, in this way, the head acceleration signal is generated highly accurately and realistically.

Optionally, the at least one processor is configured to generate the at least one transformation based on at least one of:
 a simulation model of a user sitting inside the vehicle,
 a biomechanical model of a head, a neck, a spine and a posterior part of a human.

The term "simulation model" refers to a digital model (namely, a digital prototype) of a real-world object (for example, such as a human). The simulation model facilitates in predicting a behaviour of the real-world object in real-world conditions. It will be appreciated that the simulation model of the user sitting inside the vehicle provides a virtual environment wherein physical interactions between the at least one user and the vehicle could be replicated and analysed for various driving conditions (for example, such as acceleration, braking, steering manoeuvres, and the like). Thus, by using the simulation model of the user sitting inside the vehicle, the at least one processor could reliably and accurately predict how the change in the acceleration and/or the orientation of the vehicle would affect the change in the acceleration and/or the orientation of the head of the at least one user in an (actual) real-world scenario. Beneficially, this facilitates in generating the at least one transformation (and subsequently, the head acceleration signal) in a highly accurate and realistic manner. It will be appreciated that the simulation model could be generated based on a physical experimentation (wherein impacts on a mannequin of a human sitting inside the vehicle may be analysed under various driving conditions), or be generated without any need for the physical experimentation. Optionally, the simulation model could depend on at least one of: a location of a seat on which the user is sitting, whether or not the user has put on a seat belt, a height of the user's torso from a level of the seat on which the user is sitting. Various techniques for generating simulation models of users sitting inside vehicles are well-known in the art. This has been also illustrated in conjunction with FIG. 4, for clarity and better understanding.

Furthermore, the term "biomechanical model" refers to a computational representation and simulation of a mechanical behaviour and interactions of a biological structure. It will be appreciated that the biomechanical model of the head, the neck, the spine and the posterior part of the human provides a comprehensive representation of anatomical structures and physiological responses of the human to external forces, for example, such as those experienced during a vehicular motion. Thus, by using the aforesaid biomechanical model, the at least one processor can reliably and accurately predict how the change in the acceleration and/or the orientation of the vehicle would affect the change in the acceleration and/or the orientation of the head of the at least one user in an (actual) real-world scenario. Beneficially, this facilitates in generating the at least one transformation (and subsequently, the head acceleration signal) in a highly accurate and realistic manner. It will also be appreciated that the posterior part of the human comprises a basin (namely, a pelvis) of the human, and could also comprise legs and feet of the human. The biomechanical model of the human may represent a mechanical connection (namely, a mechanical joint) between each pair of consecutive parts of the human, for example, such as a mechanical connection between the head and the neck, a mechanical connection between the neck and the spine, a mechanical connection between the spine and the basin, and the like. Furthermore, when the human is considered to be sitting inside the vehicle (particularly, on a seat of the vehicle), all the parts of the human may be considered to be coupled to respective mechanical arrangements, wherein a given mechanical arrangement comprises a spring element and a damping element. This has been also illustrated in conjunction with FIG. 5, for clarity and better understanding. Optionally, the at least one of: the simulation model, the biomechanical model are pre-generated and pre-stored at a data repository that is communicably coupled to the at least one processor.

Notably, once the head acceleration signal is generated, the at least one processor determines the expected head movement of the at least one user, namely, an anticipated or a predicted motion of the head of the at least one user. It will be appreciated that since the at least one processor has a knowledge of how much the acceleration and/or the orientation of the head of the at least one user is expected to change with respect to time, the at least one processor can easily and accurately predict a motion of the head of the at least one user accordingly. For example, the change in the acceleration of the head of the at least one user may be integrated with respect to time, to determine an expected velocity of the head, and then the expected velocity of the head may be integrated with respect to time to determine an expected displacement (namely, a change in the position of the head or an expected position) of the head. Moreover, the change in the orientation of the head of the at least one user could be utilised to determine an expected orientation of the head.

Notably, once the expected head movement is known to the at least one processor, the position and the orientation of the head being tracked by utilising the tracking means is refined (namely, adjusted) for improved accuracy. This is because when the vehicle is in motion, sudden movements and vibrations from the vehicle are likely to be experienced by the at least one user, and the tracking means may not be able to accurately and reliably track the position and the orientation of the head in real time or near-real time. This may also subsequently adversely affect a quality of the synthetic light field produced according to the position and the orientation of the head (as discussed later). Therefore, in order to mitigate this potential problem, the (tracked) position and the (tracked) orientation of the head are adjusted, according to the expected head movement (namely, according to the expected position and the expected orientation of the head of the at least one user). Since the expected head movement is determined by taking into account that the vehicle is in motion and how the change in the acceleration and/or orientation of the vehicle affect the at least one user, the expected head movement is highly accurate and pertinent to be utilised (by the at least one processor) for refining the position and the orientation of the head being tracked by the tracking means accordingly. Moreover, it will be appreciated that such refining not only enables to highly accurately determine the position and the orientation of the head, but also enables to determine the position and the orientation of the head without any latency.

Optionally, the at least one processor is configured to:
  determine an actual realised head movement of the at least one user by utilising the tracking means; and
  refine the simulation model to be specific to at least one of: the at least one user, a current environmental condition, based on differences between the expected head movement and the actual realised head movement of the at least one user.

In this regard, since the tracking means repeatedly tracks the position and the orientation of the head of the at least one user, the at least one processor can easily and accurately ascertain how the head of the at least one user has actually moved during the second time period (by using tracked positions and tracked orientations of the head during the second time period), to determine the actual realised head movement. It will be appreciated that different users may have different driving styles and may have different physiological responses to the change in the acceleration and/or the orientation of the vehicle. For example, when there is a change in the acceleration and/or the orientation of the vehicle, some users may prefer to maintain a firm grip on a steering wheel of the vehicle while driving the vehicle and make minimal head movements (i.e., the change in acceleration and/or orientation of their heads is minimal), while other users may have a tendency to make frequent and exaggerated head movements, leading to a bobble-head effect (i.e., the change in acceleration and/or orientation of their heads is significant). In addition to this, there may also be variations in environmental conditions (for example, such as, a surface of a road, a traffic density, a weather condition, and the like). Thus, in such scenarios, the expected head movement (that is determined based on the head acceleration signal) and the actual realised head movement may be considerably different from each other. In such a case, the simulation model is refined (namely, adjusted) on a per-user basis and/or on a per-environmental condition basis. This potentially ensures that the (refined) simulation model is well-applicable and suitable (for example, for accurately predicting the change in the at least one of: the acceleration, the orientation of the head) for a particular user and/or a particular environmental condition, as compared to a scenario where a same simulation model is to be employed for every user and/or every environmental condition. Beneficially, this allows for accurately and reliably determining the at least one transformation corresponding to a given user and/or a given environmental condition, based on the (refined) simulation model. In this way, the head acceleration signal is also realistically determined.

Optionally, the at least one processor is configured to refine the simulation model to be specific to a current environmental condition, based on at least one of: a current geographical location of the vehicle, current suspension settings of the vehicle, current light settings of the vehicle, a current driving speed of the vehicle, a current traffic condition, a current weather condition, a current time of day. In this regard, for the current environmental condition, there may be a scenario when the actual realised head movement and the expected head movement that is determined by utilising the simulation model are significantly different (as discussed earlier). Moreover, a same simulation model may not be well-suitable for accurately predicting the change in the at least one of: the acceleration, the orientation of the head under different environmental conditions. Thus, in such a case, the simulation model is updated (namely, refined) to be specific to the current environmental condition.

In an example, when the current geographical location of the vehicle is known, geographical maps can be utilised to determine a width and/or a curvature of a road at the current geographical location. Depending on the width and/or the curvature of the road, it can be determined how slowly or fast a user may be driving the vehicle. Notably, the user's head is likely to experience maximal movement on a curved road as compared to a straight road. In another example, when the current suspension settings of the vehicle is known (for example, such as a dampening effect due to shock absorbers, a spring rate, a ride height, an alignment of wheels of the vehicle, an anti-roll bar stiffness, and the like), an effect of the change in the at least one of: the acceleration, the orientation of the vehicle upon the change in the at least one of: the acceleration, the orientation of the head, could be determined accordingly. In yet another example, when the current light settings of the vehicle comprise fog light settings, wherein it is determined that fog lights are currently on, it may be expected that the at least one user would be driving slowly and cautiously. In such a case, the change in the acceleration and/or the orientation of the head is expected to be minimal. In still another example, greater the current driving speed of the vehicle, greater may be the change in the acceleration and/or the orientation of the head (for example, due to sudden braking or turning), and vice versa. In a case when the vehicle is being driven slowly, it may be expected that the change in the acceleration and/or the orientation of the head would be minimal. In yet another example, heavier the current traffic condition, lesser may be the change in the acceleration and/or the orientation of the head, and vice versa. This is because the at least one user may be expected to drive slowly in a heavier traffic. In still another example, when the current weather condition indicates rain, it may be expected that the at least one user would drive slowly. In such a case, the change in the acceleration and/or the orientation of the head is expected to be minimal. In yet another example, when current time of the day is night, it may be expected that the at least one user would drive slowly, as visibility of the at least one user is typically reduced during night. In such a case, the change in the acceleration and/or the orientation of the head is expected to be minimal.

Furthermore, optionally, the at least one processor is configured to determine a recent vehicular acceleration signal, based on the at least one of: the acceleration, the orientation of the vehicle sensed by the at least one sensor more recently, wherein the expected head movement is determined further based on the recent vehicular acceleration signal.

In this regard, the recent vehicular acceleration signal is determined in a similar manner in which the vehicular acceleration signal is determined, as discussed earlier. It is to be understood that the acceleration and/or the orientation of the vehicle that is sensed after the first time period (and during the second time period) could be considered to be the acceleration and/or the orientation of the vehicle that is sensed more recently. It will be appreciated that the expected head movement can be determined by taking into account the recent vehicular acceleration signal (namely, a change in the acceleration and/or the orientation of the vehicle which has not yet affected the acceleration and/or the orientation of the head of the at least one user) without even applying the at least one transformation on the recent vehicular acceleration signal. Beneficially, this facilitates in further improving a refinement of the position and the orientation of the head, based on the expected head movement.

Moreover, optionally, the tracking means comprises the at least one tracking camera and optionally comprises an infrared (IR) light emitter, wherein the at least one processor is configured to:
  detect when the change in the acceleration of the vehicle is larger than a predefined threshold; and
  when it is detected that the change in the acceleration of the vehicle is larger than the predefined threshold, perform at least one of:
    increase an illumination strength of the IR light emitter;
    shorten light emission periods of the IR light emitter;
    adjust at least one of: an exposure time, a sensitivity, a gain, an aperture size of the at least one tracking camera;
    bin pixels when capturing images using the at least one tracking camera.

In this regard, when it is detected that the change in the acceleration of the vehicle is larger than the predefined threshold, it means that the position and/or the orientation of the user's head is just about to experience a sudden and possibly drastic change. Thus, in such a case, the at least one processor is optionally configured to perform any of the aforesaid processing steps (as discussed hereinbelow in detail). It is to be understood that since the at least one sensor is employed to sense the acceleration of the vehicle repeatedly, the at least one processor can easily ascertain when the change in the acceleration exceeds the predefined threshold. Optionally, when a dot product between a current acceleration vector indicative of an acceleration of the vehicle at a current time instant, and a previous acceleration vector indicative of an acceleration of the vehicle at a previous time instant lies outside a range of 0.9 to 1.1, it is detected that the change in the acceleration of the vehicle is larger than the predefined threshold. It will be appreciated that the current acceleration vector and the previous acceleration vector may also include a gravity acceleration vector.

As mentioned earlier, the at least one tracking camera could comprise at least one of: the at least one visible-light camera, the at least one IR camera, the at least one depth camera. It will be appreciated that when the tracking means comprises the IR light emitter, the at least one tracking camera comprises the at least one IR camera. In such a case, the IR light emitter and the at least one IR camera are utilised together for tracking the position and the orientation of the head of the at least one user sitting inside the vehicle. Moreover, for tracking purposes, the IR light emitter is arranged in the vehicle in a manner that it emits the IR light towards (the head of) the at least one user.

Optionally, when utilising the tracking means, the at least one processor is configured to increase the illumination strength of the IR light emitter. When a higher illumination strength is utilised during sudden head movements, the IR light emitter produces a brighter IR light, which improves a visibility of the head of the at least one user in IR images captured by the at least one IR camera. Beneficially, this potentially improves an accuracy of tracking of the position and the orientation of the head when said IR images are subsequently processed by the at least one processor. The term "illumination strength" refers to an intensity or a brightness of the IR light emitted by the IR light emitter per unit area. The illumination strength may, for example, be in units such as lumens or watts per square meter.

When the illumination strength of the IR light emitter is increased, it may be likely that both a power consumption of the IR light emitter and a heat generation in the IR light emitter are also increased. In this regard, when the illumination strength of the IR light emitter is to be increased (for example, in scenarios of sudden head movement), the light emission periods of the IR light emitter can be shortened. Beneficially, this facilitates in considerably reducing the power consumption of the IR light emitter and the heat generation in the IR light emitter, whilst improving the accuracy of tracking the position and the orientation of the head. It will be appreciated that a light emission period of the IR light emitter refers to a time period for which the IR light emitter, in operation, emits the IR light.

Moreover, when the position and/or the orientation of the head is changing suddenly, and the at least one tracking camera is capturing a plurality of images during such a time period, it may be likely that the plurality of images are captured with a motion blur. Due to this, the accuracy of tracking of the position and the orientation of the head would be adversely affected, as the position and the orientation of the head would be inaccurately and unreliably determined upon processing the plurality of images that are captured with the motion blur. In order to mitigate this potential problem, the at least one of: the exposure time, the sensitivity, the gain, the aperture size of the at least one tracking camera, are optionally adjusted in a manner that the at least one tracking camera can utilise any of the aforesaid setting(s) to capture the plurality of images with minimal (namely, negligible) or no motion blur. In an example, the at least one tracking camera may utilise an underexposure setting or a short exposure setting for capturing the plurality of images, as compared to a default exposure setting. In another example, the at least one tracking camera may utilise higher sensitivity for capturing the plurality of images, as compared to a default sensitivity. Optionally, the at least one processor is configured to adjust the at least one of: the exposure time, the sensitivity, the gain, the aperture size, based on an amount of the change in the acceleration of the vehicle. The exposure time, the sensitivity, the gain, and the aperture size are well-known in the art.

Furthermore, when the position and/or the orientation of the head is changing suddenly, it may not be beneficial to read out each pixel individually when capturing the images using the at least one tracking camera. Therefore, when capturing the images, at least two pixels are optionally binned together to form a super pixel. It will be appreciated that binning the pixels when capturing the images facilitates in capturing the images with a low noise, at an increased framerate, and in considerably lesser time. This enables in improving the accuracy of tracking of the position and the orientation of the head. It will be appreciated that the binning of the at least two pixels could be an analog binning, for trading a resolution of the images for an improved light sensitivity and a shorter exposure time for capturing said images. Binning process and its techniques/algorithms are well-known in the art.

Moreover, optionally, the system further comprises a light field display unit, and an optical combiner arranged on an optical path of the light field display unit and on an optical path of a real-world light field of a real-world environment, wherein the at least one processor is configured to:
  utilise the tracking means to determine a relative location of a first eye and of a second eye of the at least one user with respect to the optical combiner;
  refine the relative location of the first eye and of the second eye, based on the expected head movement;
  generate an input to be employed by the light field display unit for producing a synthetic light field, based on the relative location of the first eye and of the second eye of the at least one user with respect to the optical combiner; and
  employ the input at the light field display unit to produce the synthetic light field presenting virtual content, wherein the optical combiner is employed to reflect a first part and a second part of the synthetic light field towards the first eye and the second eye of the at least one user, respectively, whilst optically combining the first part and the second part of the synthetic light field with the real-world light field.

In this regard, the tracking means is optionally employed for detecting and/or following a location of the first eye and the second eye of the at least one user also. The first eye could be one of a left eye of the at least one user and a right eye of the at least one user, whereas the second eye could be another of the left eye and the right eye. It will be appreciated that irrespective of where the at least one tracking camera is arranged, a relative location of the at least one tracking camera with respect to the optical combiner is fixed, and is pre-known to the at least one processor. This enables to determine the relative location of the first eye and of the second eye of the at least one user with respect to the optical combiner. Optionally, in this regard, when the tracking means are utilised to detect and/or follow the location of the first eye and of the second eye, a location of the first eye and of the second eye with respect to the at least one tracking camera is accurately known to the at least one processor, from the tracking data collected by the tracking means. Thus, the at least one processor can easily and accurately determine the relative location of the first eye and of the second eye with respect to the optical combiner, based on the relative location of the at least one tracking camera with respect to the optical combiner and the location of the first eye and of the second eye with respect to the at least one tracking camera. Optionally, the relative location of the first eye and of the second eye is represented in the given coordinate space.

Furthermore, optionally, the tracking means repeatedly tracks the location of both eyes of the at least one user throughout a given session of using the system. In such a case, the at least one processor is configured to repeatedly determine the relative location of the first eye and of the second eye with respect to the optical combiner (in real time or near-real time). Beneficially, this potentially allows for presenting the at least one user with an augmented view of the synthetic light field with the real-world light field in an autostereoscopic manner. It is to be understood that when the synthetic light field is being produced for a plurality of users simultaneously, the at least one processor is configured to determine relative locations of both eyes of each user from amongst the plurality of users in a same manner as discussed hereinabove. Moreover, the relative location of the first eye and of the second eye is determined with respect to the optical combiner, because the synthetic light field (that is being produced by the light field display unit) would be presented to the at least one user via the optical combiner only.

It will be appreciated that once the expected head movement is known (as discussed earlier), the at least one processor could easily and accurately refine the relative location of the first eye and of the second eye, because the first eye and the second eye are present at a fixed location on the head of the at least one user, and any movement of the head may highly likely result in similar corresponding changes in the relative location of the first eye and of the second eye. Such a refinement may involve employing geometric transformations (namely, geometric adjustments) on the (tracked) relative location of the first eye and of the second eye, based on the expected position and the expected orientation of the head as indicated by the expected head movement. It will be appreciated that when the (refined) relative location of the first eye and of the second eye is utilised, the input is accurately and realistically generated for producing the synthetic light field.

The term "optical combiner" refers to a specialised equipment that is capable of reflecting a corresponding part of the synthetic light field towards a given eye of a given user, whilst optically combining said part of the synthetic light field with the real-world light field. Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer. Optical combiners are well-known in the art. It will be appreciated that when the at least one user comprises a plurality of users, some users from amongst the plurality of users may directly face the optical combiner (namely, in almost a straight manner), while remaining users may face the optical combiner in a diagonal manner (namely, obliquely or sideways). Optionally, a tilt angle of the optical combiner with respect to an image plane of the light field display unit lies in a range of 30 degrees and 60 degrees.

The input employed by the light field display unit can be in various different forms, depending on a type of the light field display unit that is implemented. As a first example, in case of a hogel-based light field display unit or a lenticular array based light field display unit or a parallax-barrier based light field display unit, the input can be in a form of a light field image comprising pixels. As a second example, in case of a hologram-projector based light field display unit, the input is in a form of a holographic recording having a holographic interference pattern. As a third example, in case of a scanning-laser based light field display unit, the input can be in a form of any one of: image data, vector graphics, vector paths. As a fourth example, in case of a cathode ray tube (CRT)-like light field display unit, the input is in a form of a video signal comprising analog electrical signals. All the aforementioned forms of light field display units and their corresponding inputs are well-known in the art.

In case of a light field image, the input may be understood to be a two-dimensional (2D) image comprising a plurality of pixels, wherein a first part of the input comprises a first set of pixels from amongst the plurality of pixels that is responsible for generating the first part of the synthetic light field that corresponds to the first eye, and a second part of the input comprises a second set of pixels from amongst the plurality of pixels that is responsible for generating the second part of the synthetic light field that corresponds to the second eye. It will be appreciated that the pixels belonging to the first set are not arranged in a continuous manner across the light field image (namely, the input); similarly, the pixels belonging to the second set are also not arranged in a continuous manner across the light field image. Optionally, the pixels belonging to the first set and the pixels belonging to the second set may be arranged in alternating vertical stripes across a horizontal field of view of the light field image, wherein each vertical stripe comprises one or more scanlines of pixels. This is because humans perceive depth mainly based on horizontal binocular parallax. Thus, in this way, the light field image would be considerably different as compared to a conventional 2D image that is displayed via conventional 2D displays, because the (single) light field image would comprise visual information corresponding to the first eye as well as the second eye of the at least one user.

In some implementations, the virtual content presented by the synthetic light field corresponds to at least one virtual object. Optionally, in this regard, the at least one processor is configured to generate the input from a perspective of the relative location of the first eye and of the second eye of the at least one user, by employing a three-dimensional (3D) model of the at least one virtual object. The term "virtual object" refers to a computer-generated object (namely, a digital object). Examples of the at least one virtual object may include, but are not limited to, a virtual navigation tool, a virtual gadget, a virtual message, a virtual entity, a virtual entertainment media, a virtual vehicle or part thereof, and a virtual information. The term "three-dimensional model" of the at least one virtual object refers to a data structure that comprises comprehensive information pertaining to the at least one virtual object. Such a comprehensive information is indicative of at least one of: a plurality of features of the at least one virtual object or its portion, a shape and a size of the at least one virtual object or its portion, a pose of the at least one virtual object or its portion, a material of the at least one virtual object or its portion, a colour and an optical depth of the at least one virtual object or its portion. The 3D model may be generated in the form of a 3D polygonal mesh, a 3D point cloud, a 3D surface cloud, a voxel-based model, or similar. Optionally, the 3D model is generated in the given coordinate space. Optionally, the at least one processor is configured to store the 3D model at a data repository that is communicably coupled to the at least one processor. The data repository may be implemented as a memory of the at least one processor, a cloud-based database, or similar.

The term "real-world light field" refers to a light field emanating from the real-world environment in which the at least one user is present. Moreover, the term "synthetic light field" refers to a light field that is produced (namely, generated) synthetically by the light field display unit. It will be appreciated that in case of the real-world light field, light from, for example, a natural light source (such as the Sun) and/or an artificial light source (such as a lamp, a bulb, a tube-light, or similar), are reflected off real-world objects (or their portions) to be incident towards the first eye and the second eye of the at least one user. In this way, visual information (for example, such as colour information, optical depth information, and the like) pertaining to said real-world objects is typically perceived by the left eye and the right eye. On the other hand, in case of the synthetic light field, light emanating from the light field display unit, upon reflecting off the optical combiner, is incident on the first eye and the second eye of the at least one user. In this way, visual information pertaining to the at least one virtual object (namely, the virtual content) can be perceived by the first eye and the second eye.

It will also be appreciated that when the optical combiner reflects the first part and the second part of the synthetic light field towards the first eye and the second eye, respectively, it means that light produced by a first part of the input, generating the first part of the synthetic light field, is directed towards the first eye upon reflecting off the optical combiner. Simultaneously, light produced by a second part of the input, generating the second part of the synthetic light field, is directed towards the second eye upon reflecting off the optical combiner. Therefore, upon said reflection of the first part and the second part of the synthetic light field, visual information corresponding to the first part of the input and the second part of the input is perceived by the first eye and the second eye, respectively. It is to be understood that due to binocular disparity, visual information for the first eye and visual information for the second eye would be slightly offset from each other. Beneficially, this enables in perceiving depth, when the virtual content is presented to the at least one user using the synthetic light field. The binocular disparity is well-known in the art. Additionally, when the first part and the second part of the synthetic light field are optically combined with the real-world light field, the virtual content is perceived by the left eye and the right eye, along with the visual information pertaining to the real-world objects present in the real-world environment. Advantageously, this provides a result that is similar to displaying a combined view of a virtual image augmenting a real-world image to the at least one user.

Further, the term "light field display unit" refers to a specialised equipment that is capable of producing the synthetic light field. In other words, the light field display unit is utilised to employ the input (generated by the at least one processor) to produce the synthetic light field at a given resolution. As mentioned earlier, different types of light field display units can be implemented. For example, the light field display unit can be any one of: a hogel-based light field display unit, a lenticular array based light field display unit, a parallax-barrier based light field display unit, a hologram-projector based light field display unit, a scanning-laser based light field display unit, a CRT-like light field display unit.

It will be appreciated that in a case where the at least one user comprises a plurality of user, the same input is employed by the light field display unit for producing the synthetic light field presenting the virtual content to the plurality of users simultaneously. In such a case, a resolution of the first part and the second part of the synthetic light field being displayed to a particular user depends on a number of users for which the input has been generated. For example, when the synthetic light field is to be produced for a single user, the first part of the synthetic light field may be generated by 50 percent of the input, and the second part of the synthetic light field may be generated by a remaining 50 percent of the input. In such a case, an effective resolution per eye would be a half of a native display resolution of the light field display unit. However, when the synthetic light field is to be produced for two users, for each of the two users, the first part of the synthetic light field may be generated by 25 percent of the input, and the second part of the synthetic light field may be generated by 25 percent of the input. In such a case, an effective resolution per eye would be one-fourth of the native display resolution of the light field display unit. In other words, greater the number of users, lower is the resolution of the first part and the second part of the synthetic light field being displayed to a single user, and vice versa.

Optionally, the input is implemented in a form of a light field image, wherein the at least one processor is configured to:
  detect when the change in the acceleration of the vehicle is larger than a predefined threshold; and
  when it is detected that the change in the acceleration of the vehicle is larger than the predefined threshold, perform at least one of:
    shorten light emission periods of the light field display unit,
    apply a synthetic motion blur effect in light field images when the light emission periods of the light field display unit are shortened,
    reduce a resolution of the light field images, increase a framerate at which the light field images are displayed by the light field display unit.

In this regard, when it is detected that the rate of change of the position and/or the orientation of the head of the at least one user is considerably high, the at least one processor is optionally configured to perform any of the aforesaid processing steps (as discussed hereinbelow in detail). Information pertaining to the aforesaid detection has been already described earlier in detail.

It will be appreciated that a light emission period refers to a time period for which the light field display unit is displaying the light field image to the at least one user. Notably, when the light emission period is longer and the position and/or the orientation of the head is changing more frequently, a same light field image would be displayed to the at least one user for a longer time period during which it may be highly likely that the relative location of the first eye and of the second eye would have changed (due to a sudden change in the position and/or the orientation of the head). This deteriorates an overall viewing experience of the at least one user, as the same light field image may appear to be inconsistent and unrealistic when seen from various different perspectives of the first eye and the second eye. In order to mitigate this potential problem, the light emission periods are optionally shortened in a manner that different light field images corresponding to different relative locations of the first eye and of the second eye are displayed to the user using shorter light emission periods when the position and/or the orientation of the head is changing suddenly. Thus, the viewing experience of the at least one user becomes highly realistic and immersive, when said different light field images are displayed to the at least one user.

Moreover, when the rate of change of the position and/or the orientation of the head of the at least one user is considerably high, the first eye and the second eye of the at least one user typically experience a natural motion blur when viewing a real-world scene of the real-world environment. In such a case, when the user would perceive the light field images to be sharper than the (naturally-blurred) real-world scene, an overall viewing experience of the at least one user would become unnatural. Thus, during generation of the light field images, the at least one processor is optionally configured to apply the synthetic motion blur effect in the light field images such that visual information represented in the light field image is to be perceived by the first eye and the second eye in a slightly blurred manner (instead of perceiving the visual information sharply and in-focus) that is similar to the blur perceived in the real-world content. In this way, the light field images would appear to be more natural and blend seamlessly with the (naturally-blurred) real-world scene of the real-world environment; resulting in an improved viewing experience of the at least one user. Optionally, when applying the synthetic motion blur effect, the at least one processor is configured to employ at least one image blurring algorithm. Image blurring algorithms are well-known in the art.

Since the position and/or the orientation of the head is changing suddenly and the light field images are to be perceived by the first eye and the second eye in the blurred manner anyway (as discussed hereinabove), the at least one processor is optionally configured to reduce the resolution of the light field images. It is to be understood that this may not affect an overall visual-quality of the light field images as they are to be perceived in the blurred manner anyway. This may potentially facilitate in saving processing resources and processing time of the at least one processor.

Furthermore, when the rate of change of the position and/or the orientation of the head of the at least one user is considerably high, and the light emission periods are shortened (as discussed earlier), the at least one processor is optionally configured to increase the framerate (namely, a number of frames per second) at which the light field images are displayed. Thus, for the time period when the position and/or the orientation of the head is changing suddenly, a higher number of light field images per unit time are displayed to the at least one user. Beneficially, in such a case, the viewing experience of the at least one user becomes highly realistic and immersive.

The present disclosure also relates to the method as described above. Various embodiments and variants disclosed above, with respect to the aforementioned first aspect, apply mutatis mutandis to the method.

Optionally, the method further comprises determining a recent vehicular acceleration signal, based on the at least one of: the acceleration, the orientation of the vehicle sensed by the at least one sensor more recently, wherein the expected head movement is determined further based on the recent vehicular acceleration signal.

Optionally, in the method, the at least one transformation comprises at least one of:
  a phase-shift transformation corresponding to a delay between a start of the second time period and a start of the first time period,
  a dampening transformation corresponding to dampening of an effect of the change in the at least one of: the acceleration, the orientation of the vehicle upon the change in the at least one of: the acceleration, the orientation of the head of the at least one user.

Optionally, the method further comprises generating the at least one transformation based on at least one of:
  a simulation model of a user sitting inside the vehicle,
  a biomechanical model of a head, a neck, a spine and a posterior part of a human.

Optionally, the method further comprises:
  determining an actual realised head movement of the at least one user by utilising the tracking means; and
  refining the simulation model to be specific to at least one of: the at least one user, a current environmental condition, based on differences between the expected head movement and the actual realised head movement of the at least one user.

Optionally, the method further comprises refining the simulation model to be specific to a current environmental condition, based on at least one of: a current geographical location of the vehicle, current suspension settings of the vehicle, current light settings of the vehicle, a current driving speed of the vehicle, a current traffic condition, a current weather condition, a current time of day.

Optionally, the tracking means comprises at least one tracking camera and optionally comprises an infrared (IR) light emitter, wherein the method further comprises:
  detecting when the change in the acceleration of the vehicle is larger than a predefined threshold; and
  when it is detected that the change in the acceleration of the vehicle is larger than the predefined threshold, performing at least one of:
    increasing an illumination strength of the IR light emitter;
    shortening light emission periods of the IR light emitter;
    adjusting at least one of: an exposure time, a sensitivity, a gain, an aperture size of the at least one tracking camera;
    binning pixels when capturing images using the at least one tracking camera.

Moreover, optionally, the method further comprises:
  utilising the tracking means to determine a relative location of a first eye and of a second eye of the at least one user with respect to an optical combiner, wherein the optical combiner arranged on an optical path of a light field display unit and on an optical path of a real-world light field of a real-world environment;
  refining the relative location of the first eye and of the second eye, based on the expected head movement;
  generating an input to be employed by the light field display unit for producing a synthetic light field, based on the relative location of the first eye and of the second eye of the at least one user with respect to the optical combiner; and
  employing the input at the light field display unit to produce the synthetic light field presenting virtual content, wherein the optical combiner is employed to reflect a first part and a second part of the synthetic light field towards the first eye and the second eye of the at least one user, respectively, whilst optically combining the first part and the second part of the synthetic light field with the real-world light field.

Optionally, the input is implemented in a form of a light field image, wherein the method further comprises:
  detecting when the change in the acceleration of the vehicle is larger than a predefined threshold; and
  when it is detected that the change in the acceleration of the vehicle is larger than the predefined threshold, performing at least one of:
    shortening light emission periods of the light field display unit,
    applying a synthetic motion blur effect in light field images when the light emission periods of the light field display unit are shortened,
    reducing a resolution of the light field images,
    increasing a framerate at which the light field images are displayed by the light field display unit.

DETAILED DESCRIPTION OF THE DRAWINGS

Referring to FIG. 1, illustrated is a block diagram of an architecture of a system 100 for improving tracking accuracy with head pose prediction, in accordance with an embodiment of the present disclosure. The system 100 comprises tracking means 102, at least one sensor (for example, depicted as a sensor 104), and at least one processor (for example, depicted as a processor 106). Optionally, the system 100 further comprises a light field display unit 108 and an optical combiner 110. The processor 106 is communicably coupled to the tracking means 102, the sensor 104 and optionally, to the light field display unit 108. Optionally, the tracking means 102 comprises a tracking camera 112 and an infrared (IR) light emitter 114. Optionally, the processor 106 is communicably coupled to the tracking camera 112 and the IR light emitter 114.

It may be understood by a person skilled in the art that FIG. 1 includes a simplified example implementation of the system 100, for sake of clarity, which should not unduly limit the scope of the claims herein. It is to be understood that the specific implementation of the system 100 is not to be construed as limiting it to specific numbers or types of tracking means, sensors, processors, light field display units, optical combiners, tracking cameras, and IR light emitters. The person skilled in the art will recognize many variations, alternatives, and modifications of embodiments of the present disclosure.

Figure 2:
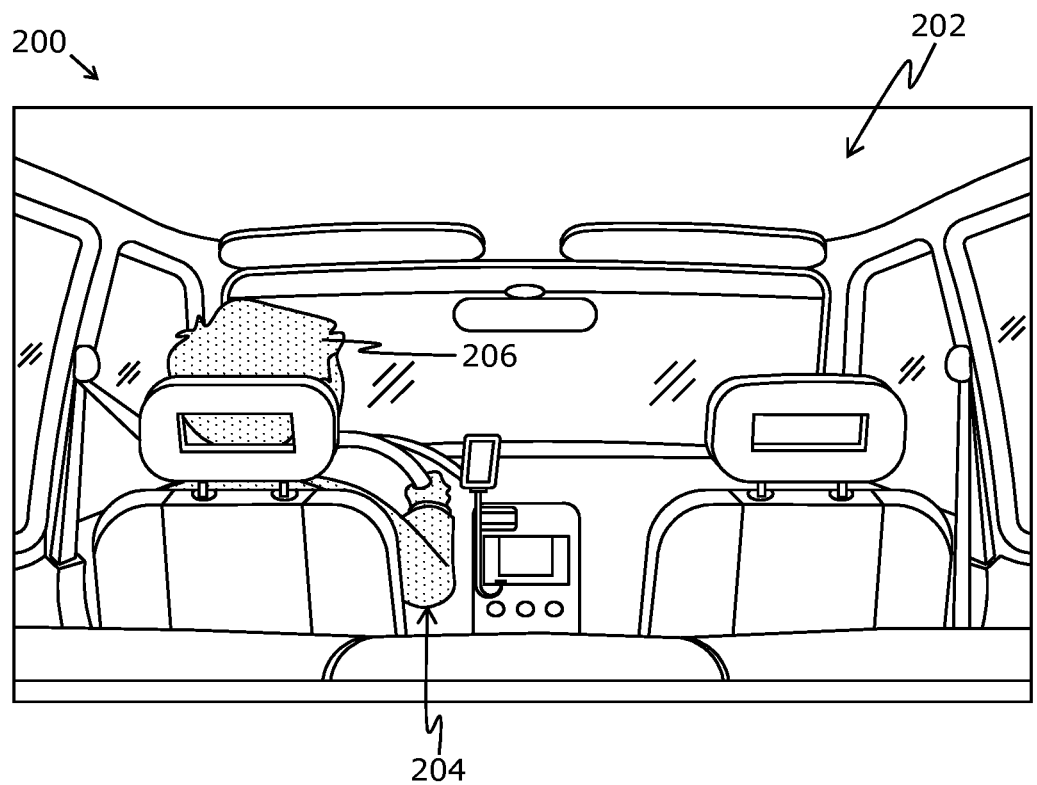
FIG. 2 illustrates a real-world environment in which a system for improving tracking accuracy with head pose prediction can be employed, in accordance with an embodiment of the present disclosure.

Referring to FIG. 2, illustrated is a real-world environment 200 in which a system for improving tracking accuracy with head pose prediction can be employed, in accordance with an embodiment of the present disclosure. With reference to FIG. 2, the real-world environment 200 is shown to comprise a vehicle 202 (for example, depicted as a car) in which a user 204 is sitting. The user is shown to be driving the vehicle 202. For sake of simplicity and clarity, only a single user (i.e., the user 204) is shown inside the vehicle 202; however, there could also be other user(s) (for example, co-passenger(s)) inside the vehicle 202. The system enables in refining a position and an orientation of a head 206 of the user 204 being tracked by utilising tracking means, based on an expected (namely, predicted) head movement of the user 204.

Figure 3:
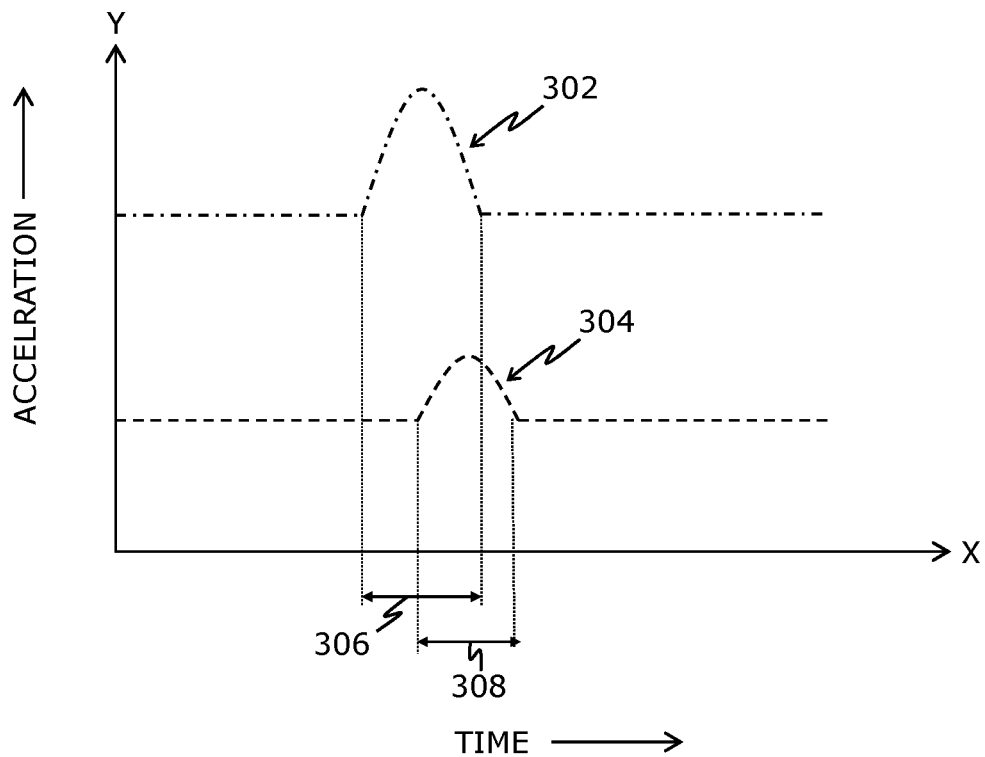
FIG. 3 illustrates an exemplary graphical representation for a vehicular acceleration signal and a head acceleration signal, in accordance with an embodiment of the present disclosure.

Referring to FIG. 3, illustrated is an exemplary graphical representation for a vehicular acceleration signal 302 (for example, depicted using a dash-dot line curve) and a head acceleration signal 304 (for example, depicted using a dashed line curve), in accordance with an embodiment of the present disclosure. With reference to FIG. 3, a positive X-axis represents time, and a positive Y-axis represents an acceleration. The vehicular acceleration signal 302 is indicative of a change in at least one of: an acceleration, an orientation of a vehicle (for example, a car) sensed (by at least one sensor) during a first time period 306. The head acceleration signal 304 is indicative of a change in at least one of: an acceleration, an orientation of a head of at least one user sitting inside the vehicle. For sake of simplicity, only acceleration has been depicted in the exemplary graphical representation. The head acceleration signal 304 is generated for a second time period 308, by applying at least one transformation to the vehicular acceleration signal 302. The second time period 308 is shown to be partially overlapping with the first time period 306 in a manner that the second time period 308 starts after a start of the first time period 306, and ends after the first time period 306 has ended.

Figure 4:
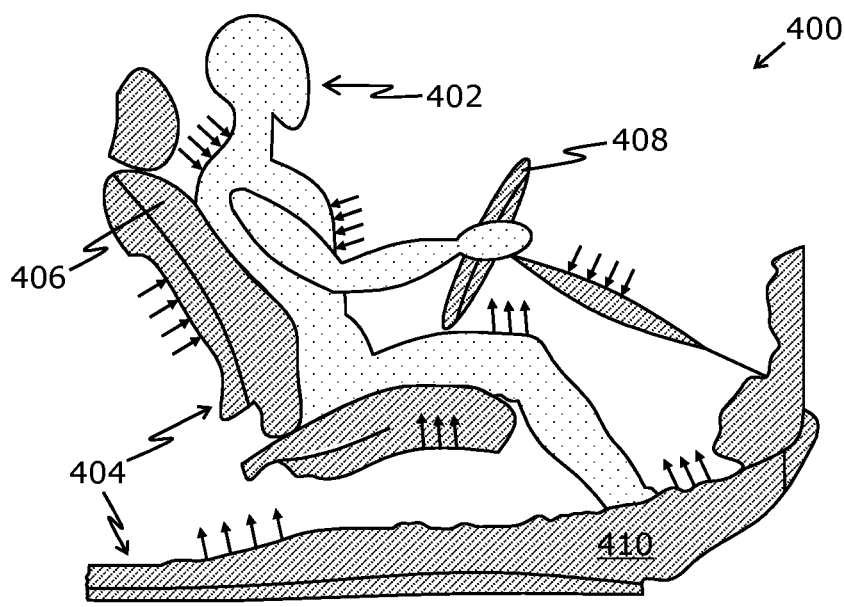
FIG. 4 illustrates an exemplary simulation model of a user sitting inside a vehicle, in accordance with an embodiment of the present disclosure.

Referring to FIG. 4, illustrated is an exemplary simulation model 400 of a user 402 (for example, depicted using a dotted pattern) sitting inside a vehicle 404 (for example, depicted using a diagonal-stripes pattern), in accordance with an embodiment of the present disclosure. With reference to FIG. 4, the user 402 is shown to be sitting on a driver's seat 406 of the vehicle 404, while driving the vehicle 404. For sake of simplicity, the vehicle is shown to comprise the driver's seat 406, a steering wheel 408, and a bottom part 410 of the vehicle 404. The simulation model 400 is utilised (by at least one processor) for generating at least one transformation that is to be applied to a vehicular acceleration signal to generate a head acceleration signal. This is because expected body posture dynamics of the user 402 in response to a change in a vehicular motion (namely, an acceleration and/or an orientation of the vehicle 404) could be accurately known from the simulation model 400. For sake of simplicity, various solid line arrows in the simulation model 400 depict directions of impacts (for example, such as forces) on a body of the user 402 and a body of the vehicle 404, when the vehicle is being driven by the user 402. In an example, during an acceleration of the vehicle 404, a head of the user 402 may tilt backward; whereas during braking, the head of the user 402 may lean forward. Additionally, steering manoeuvres performed by the user 402 while driving may result in lateral shifts in a position and/or an orientation of the head of the user 402. Thus, in such scenarios, the simulation model 400 could be utilised to determine an expected change in at least one of: an acceleration, an orientation of the head of the user 402, in order to generate the at least one transformation.

Figure 5:
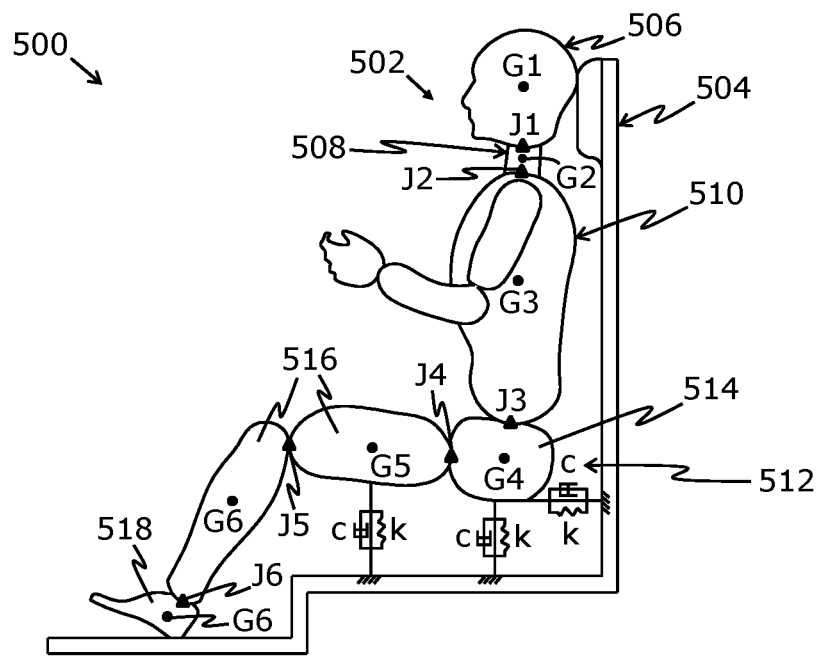
FIG. 5 illustrates an exemplary biomechanical model of a human sitting on a seat of a vehicle, in accordance with an embodiment of the present disclosure.

Referring to FIG. 5, illustrated is an exemplary biomechanical model 500 of a human 502 sitting on a seat 504 of a vehicle, in accordance with an embodiment of the present disclosure. With reference to FIG. 5, the biomechanical model 500 is shown to be generated by considering that a body of the human 502 comprises four parts, namely, a head 506, a neck 508, a spine 510, and a posterior part 512. The posterior part 512 comprises a basin 514, and may further comprise legs 516 and feet 518. In the biomechanical model 500, G1, G2, G3, G4, G5, and G6 represent centres of gravity of the head 506, the neck 508, the spine 510, the basin 514, the legs 516, and the feet 518, respectively. The centres of gravity G1-G6 are depicted using small solid circles. J1 represents a mechanical connection (namely, a mechanical joint) between the head 506 and the neck 508. J2 represents a mechanical connection between the neck 508 and the spine 510. J3 represents a mechanical connection between the spine 510 and the basin 514. J4 represents a mechanical connection between the basin 514 and a first portion of the legs 516. J5 represents a mechanical connection between the first portion and a second portion of the legs 516. J6 represents a mechanical connection between the second portion of the legs 516 and the feet 518. The mechanical connections J1-J6 are depicted using small solid triangles. Furthermore, all the parts of the human 502 are considered to be coupled to respective mechanical arrangements of the vehicle, wherein a given mechanical arrangement comprises a spring element k and a damping element c. For sake of simplicity and clarity, mechanical arrangements corresponding to only the basin 514 and the legs 516 are shown. It will be appreciated that the respective mechanical arrangements are utilised in the biomechanical model 500 to characterise deformable properties of the parts of the human 502 and vibrations that are transmitted from the seat 504 of the vehicle to the body of the human 504, when the vehicle is in motion (namely, is being driven). The biomechanical model 500 may be generated by considering an average weight (for example, such as 80 kilograms) for the human 502.

Figure 6:
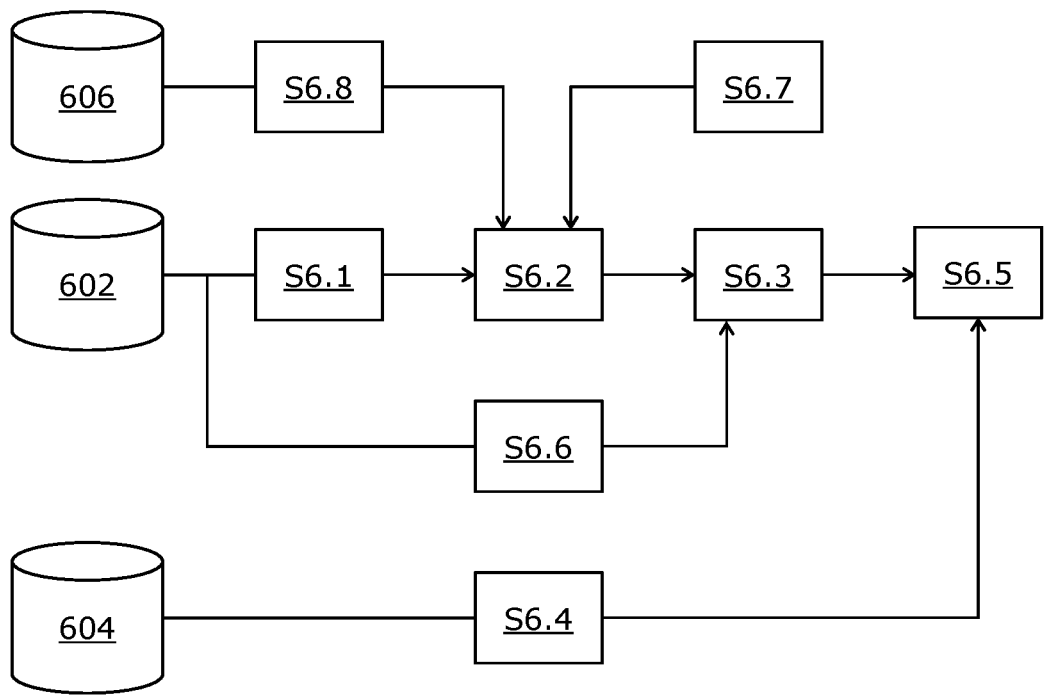
FIG. 6 illustrates an exemplary process flow in a system for improving tracking accuracy with head pose prediction, in accordance with an embodiment of the present disclosure.

Referring to FIG. 6, illustrated is an exemplary process flow in a system for improving tracking accuracy with head pose prediction, in accordance with an embodiment of the present disclosure. With reference to FIG. 6, at step S6.1, sensor data 602, collected by at least one sensor, is processed to determine a vehicular acceleration signal for a first time period, wherein said sensor data 602 comprises information pertaining to at least one of: an acceleration, an orientation of the vehicle sensed by the at least one sensor during the first time period, and wherein the vehicular acceleration signal is indicative of a change in the at least one of: the acceleration, the orientation of the vehicle. At step S6.2, a head acceleration signal is generated for a second time period by applying at least one transformation to the vehicular acceleration signal, wherein the head acceleration signal is indicative of a change in at least one of: an acceleration, the orientation of the head of the at least one user. At step S6.3, an expected head movement of the at least one user is determined, based on the head acceleration signal. At step S6.4, tracking data 604, collected by tracking means, is processed to determine a position and an orientation of a head of at least one user sitting inside a vehicle. At step S6.5, the position and the orientation of the head of the at least one user (being tracked by utilising the tracking means) are refined, based on the expected head movement. Optionally, at step S6.6, a recent vehicular acceleration signal is determined, based on the at least one of: the acceleration, the orientation of the vehicle sensed by the at least one sensor more recently, wherein the expected head movement is determined (at step S6.3) further based on the recent vehicular acceleration signal. Optionally, at step S6.7, a simulation model is refined to be specific to at least one of: the at least one user, a current environmental condition, based on differences between the expected head movement and an actual realised head movement of the at least one user, wherein the simulation model is utilised to generate the at least one transformation (as described earlier at step S6.2). Additionally, optionally, at step S6.8, information 606 is utilised to refine the simulation model to be specific to the current environmental condition, wherein said information 606 pertains to at least one of: a current geographical location of the vehicle, current suspension settings of the vehicle, current light settings of the vehicle, a current driving speed of the vehicle, a current traffic condition, a current weather condition, a current time of day.

FIGS. 2, 3, 4, 5, and 6 are merely examples, which should not unduly limit the scope of the claims herein. A person skilled in the art will recognize many variations, alternatives, and modifications of embodiments of the present disclosure.

Figure 7:
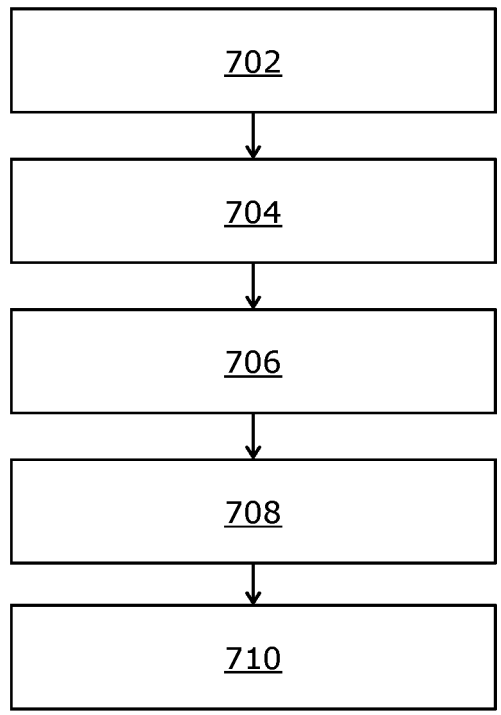
FIG. 7 illustrates steps of a method for improving tracking accuracy with head pose prediction, in accordance with an embodiment of the present disclosure.

Referring to FIG. 7, illustrated are steps of a method for improving tracking accuracy with head pose prediction, in accordance with an embodiment of the present disclosure. At step 702, tracking means is utilised to track a position and an orientation of a head of at least one user sitting inside a vehicle. At step 704, a vehicular acceleration signal is determined for a first time period, based on at least one of: an acceleration, an orientation of the vehicle sensed by employing at least one sensor during the first time period, wherein the vehicular acceleration signal is indicative of a change in the at least one of: the acceleration, the orientation of the vehicle. At step 706, at least one transformation is applied to the vehicular acceleration signal to generate a head acceleration signal for a second time period, wherein the head acceleration signal is indicative of a change in at least one of: an acceleration, the orientation of the head of the at least one user. At step 708, an expected head movement of the at least one user is determined, based on the head acceleration signal. At step 710, the position and the orientation of the head of the at least one user are refined based on the expected head movement, the position and the orientation being tracked by utilising the tracking means.

The aforementioned steps are only illustrative and other alternatives can also be provided where one or more steps are added, one or more steps are removed, or one or more steps are provided in a different sequence without departing from the scope of the claims herein.

Figure 8:
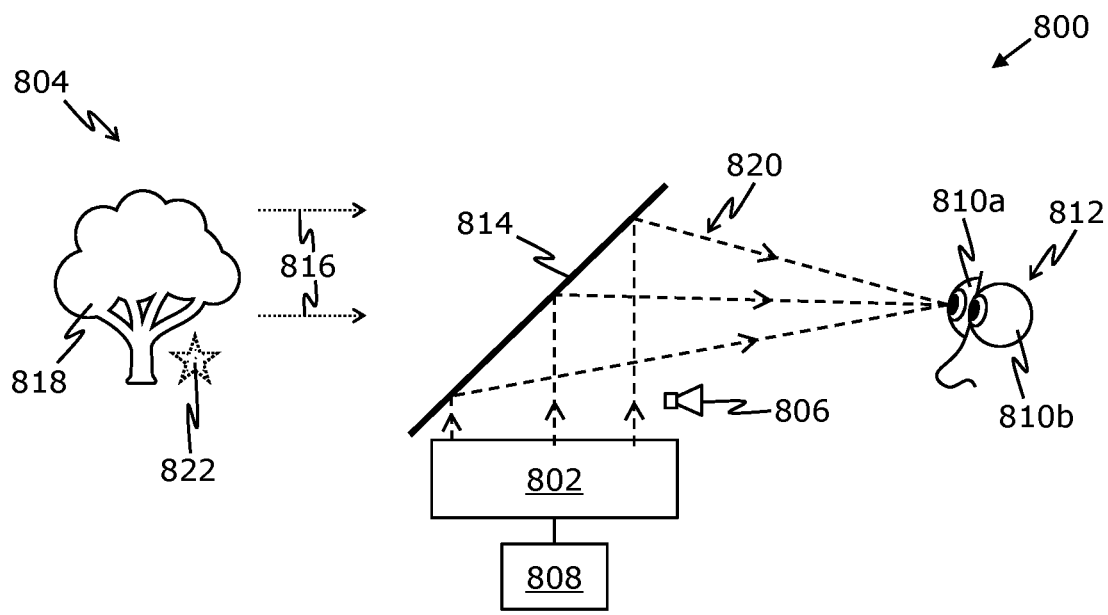
FIG. 8 illustrates an exemplary scenario in which a synthetic light field is produced using a light field display unit, and is optically combined with a real-world light field using an optical combiner, in accordance with an embodiment of the present disclosure.

Referring to FIG. 8, illustrated is an exemplary scenario 800 in which a synthetic light field 820 is produced using a light field display unit 802, and is optically combined with a real-world light field 816 using an optical combiner 814, in accordance with an embodiment of the present disclosure. With reference to FIG. 8, a real-world environment 804 is shown, wherein tracking means 806 is utilised by at least one processor (depicted as a processor 808) to determine a relative location of a first eye 810a and of a second eye 810b of a user 812 with respect to an optical combiner 814, the optical combiner 814 being arranged on the optical path of the light field display unit 802 and on an optical path of the real-world light field 816 of the real-world environment 804. In the real-world environment 804, there are one or more real-world objects, depicted as a real-world object 818 (for example, depicted as a tree), which are present within a field of view of the user 812. The tracking means 806 is shown to be implemented, for example, as a tracking camera. An input to be employed by the light field display unit 802 is generated by the processor 808, based on the relative location of the first eye 810a and of the second eye 810b of the user 812 with respect to the optical combiner 814. The input is employed at the light field display unit 802 to produce the synthetic light field 820 presenting virtual content, for example, such as a virtual object 822 (for example, depicted as a star having a dotted pattern). For illustration purposes only, the virtual object 822 is shown to be presented at an optical depth that is (almost) same as an optical depth of the real-world object 818. The optical combiner 814 is employed to reflect a first part and a second part of the synthetic light field 820 towards the first eye 810a and the second eye 810b, respectively, whilst optically combining the first part and the second part of the synthetic light field 820 with the real-world light field 816.

FIG. 8 is merely an example, which should not unduly limit the scope of the claims herein. A person skilled in the art will recognize many variations, alternatives, and modifications of embodiments of the present disclosure.

The invention claimed is:
1. A system comprising:
tracking means;
at least one sensor employed to sense at least one of: an acceleration, an orientation of a vehicle; and
at least one processor configured to:
  utilise the tracking means to track a position and an orientation of a head of at least one user sitting inside the vehicle;
  determine a vehicular acceleration signal for a first time period, based on the at least one of: the acceleration, the orientation of the vehicle sensed during the first time period, wherein the vehicular acceleration signal is indicative of a change in the at least one of: the acceleration, the orientation of the vehicle;
  apply at least one transformation to the vehicular acceleration signal to generate a head acceleration signal for a second time period, wherein the head acceleration signal is indicative of a change in at least one of: an acceleration, the orientation of the head of the at least one user;
  determine an expected head movement of the at least one user, based on the head acceleration signal; and
  refine the position and the orientation of the head of the at least one user being tracked by utilising the tracking means, based on the expected head movement;
wherein the at least one processor is configured to generate the at least one transformation based on at least one of:
  a simulation model of a user sitting inside the vehicle,
  a biomechanical model of a head, a neck, a spine and a posterior part of a human.

2. The system of claim 1, wherein the at least one processor is configured to determine a recent vehicular acceleration signal, based on the at least one of: the acceleration, the orientation of the vehicle sensed by the at least one sensor more recently, wherein the expected head movement is determined further based on the recent vehicular acceleration signal.

3. The system of claim 1, wherein the at least one transformation comprises at least one of:
  a phase-shift transformation corresponding to a delay between a start of the second time period and a start of the first time period,
  a dampening transformation corresponding to dampening of an effect of the change in the at least one of: the acceleration, the orientation of the vehicle upon the change in the at least one of: the acceleration, the orientation of the head of the at least one user.

4. The system of claim 1, wherein the at least one processor is configured to: determine an actual realised head movement of the at least one user by utilising the tracking means; and refine the simulation model to be specific to at least one of: the at least one user, a current environmental condition, based on differences between the expected head movement and the actual realised head movement of the at least one user.

5. The system of claim 1, wherein the at least one processor is configured to refine the simulation model to be specific to a current environmental condition, based on at least one of: a current geographical location of the vehicle, current suspension settings of the vehicle, current light settings of the vehicle, a current driving speed of the vehicle, a current traffic condition, a current weather condition, a current time of day.

6. The system of claim 1, wherein the tracking means comprises at least one tracking camera and optionally comprises an infrared (IR) light emitter, wherein the at least one processor is configured to:
  detect when the change in the acceleration of the vehicle is larger than a predefined threshold; and
  when it is detected that the change in the acceleration of the vehicle is larger than the predefined threshold, perform at least one of:
    increase an illumination strength of the IR light emitter;
    shorten light emission periods of the IR light emitter;
    adjust at least one of: an exposure time, a sensitivity, a gain, an aperture size of the at least one tracking camera;
    bin pixels when capturing images using the at least one tracking camera.

7. The system of claim 1, further comprising a light field display unit, and an optical combiner arranged on an optical path of the light field display unit and on an optical path of a real-world light field of a real-world environment, wherein the at least one processor is configured to:
  utilise the tracking means to determine a relative location of a first eye and of a second eye of the at least one user with respect to the optical combiner;

refine the relative location of the first eye and of the second eye, based on the expected head movement;

generate an input to be employed by the light field display unit for producing a synthetic light field, based on the relative location of the first eye and of the second eye of the at least one user with respect to the optical combiner; and employ the input at the light field display unit to produce the synthetic light field presenting virtual content, wherein the optical combiner is employed to reflect a first part and a second part of the synthetic light field towards the first eye and the second eye of the at least one user, respectively, whilst optically combining the first part and the second part of the synthetic light field with the real-world light field.

8. The system of claim 7, wherein the input is implemented in a form of a light field image, and wherein the at least one processor is configured to:

detect when the change in the acceleration of the vehicle is larger than a predefined threshold; and when it is detected that the change in the acceleration of the vehicle is larger than the predefined threshold, perform at least one of:

shorten light emission periods of the light field display unit, apply a synthetic motion blur effect in light field images when the light emission periods of the light field display unit are shortened, reduce a resolution of the light field images, increase a framerate at which the light field images are displayed by the light field display unit.

9. A method comprising:

utilising tracking means to track a position and an orientation of a head of at least one user sitting inside a vehicle;

determining a vehicular acceleration signal for a first time period, based on at least one of: an acceleration, an orientation of the vehicle sensed by employing at least one sensor during the first time period, wherein the vehicular acceleration signal is indicative of a change in the at least one of: the acceleration, the orientation of the vehicle;

applying at least one transformation to the vehicular acceleration signal to generate a head acceleration signal for a second time period, wherein the head acceleration signal is indicative of a change in at least one of: an acceleration, the orientation of the head of the at least one user;

determining an expected head movement of the at least one user, based on the head acceleration signal;

refining the position and the orientation of the head of the at least one user being tracked by utilising the tracking means, based on the expected head movement; and generating the at least one transformation based on at least one of:

a simulation model of a user sitting inside the vehicle, a biomechanical model of a head, a neck, a spine and a posterior part of a human.

10. The method of claim 9, further comprising determining a recent vehicular acceleration signal, based on the at least one of: the acceleration, the orientation of the vehicle sensed by the at least one sensor more recently, wherein the expected head movement is determined further based on the recent vehicular acceleration signal.

11. The method of claim 9, wherein the at least one transformation comprises at least one of:

a phase-shift transformation corresponding to a delay between a start of the second time period and a start of the first time period, a dampening transformation corresponding to dampening of an effect of the change in the at least one of: the acceleration, the orientation of the vehicle upon the change in the at least one of: the acceleration, the orientation of the head of the at least one user.

12. The method of claim 9, further comprising:

determining an actual realised head movement of the at least one user by utilising the tracking means; and refining the simulation model to be specific to at least one of: the at least one user, a current environmental condition, based on differences between the expected head movement and the actual realised head movement of the at least one user.

13. The method of claim 9, further comprising refining the simulation model to be specific to a current environmental condition, based on at least one of: a current geographical location of the vehicle, current suspension settings of the vehicle, current light settings of the vehicle, a current driving speed of the vehicle, a current traffic condition, a current weather condition, a current time of day.

14. The method of claim 9, wherein the tracking means comprises at least one tracking camera and optionally comprises an infrared (IR) light emitter, and wherein the method further comprises:

detecting when the change in the acceleration of the vehicle is larger than a predefined threshold; and when it is detected that the change in the acceleration of the vehicle is larger than the predefined threshold, performing at least one of:

increasing an illumination strength of the IR light emitter;

shortening light emission periods of the IR light emitter;

adjusting at least one of: an exposure time, a sensitivity, a gain, an aperture size of the at least one tracking camera;

binning pixels when capturing images using the at least one tracking camera.

15. The method of claim 9, further comprising:

utilising the tracking means to determine a relative location of a first eye and of a second eye of the at least one user with respect to an optical combiner, wherein the optical combiner arranged on an optical path of a light field display unit and on an optical path of a real-world light field of a real-world environment;

refining the relative location of the first eye and of the second eye, based on the expected head movement;

generating an input to be employed by the light field display unit for producing a synthetic light field, based on the relative location of the first eye and of the second eye of the at least one user with respect to the optical combiner; and employing the input at the light field display unit to produce the synthetic light field presenting virtual content, wherein the optical combiner is employed to reflect a first part and a second part of the synthetic light field towards the first eye and the second eye of the at least one user, respectively, whilst optically combining the first part and the second part of the synthetic light field with the real-world light field.

16. The method of claim 15, wherein the input is implemented in a form of a light field image, and wherein the method further comprises:
- detecting when the change in the acceleration of the vehicle is larger than a predefined threshold; and
- when it is detected that the change in the acceleration of the vehicle is larger than the predefined threshold, performing at least one of:
    - shortening light emission periods of the light field display unit,
    - applying a synthetic motion blur effect in light field images when the light emission periods of the light field display unit are shortened,
    - reducing a resolution of the light field images,
    - increasing a framerate at which the light field images are displayed by the light field display unit.

* * * * *